United States

Stern

[11] 3,807,127
[45] Apr. 30, 1974

[54] METHOD OF CLOSING A LIQUID CRYSTAL DEVICE

[75] Inventor: Herman Abraham Stern, Somerville, N.J.

[73] Assignee: RCA Corporation, New York, N.Y.

[22] Filed: Sept. 5, 1972

[21] Appl. No.: 286,249

[52] U.S. Cl. ............... 53/43, 29/522, 350/160 LC
[51] Int. Cl......... B65b 7/28, B67b 1/04, B67b 5/02
[58] Field of Search .................. 29/522; 53/43, 42; 350/160 LC

[56] References Cited
UNITED STATES PATENTS

| 1,773,855 | 8/1930 | Peters .................................. 29/522 |
| 2,752,693 | 7/1956 | Wullschleger .................... 29/522 X |
| 3,362,129 | 1/1968 | Scherer et al........................... 53/43 |
| 3,522,648 | 8/1970 | Weber ................................... 29/522 |
| 3,584,101 | 6/1971 | Martz................................... 29/522 |
| 3,701,368 | 10/1972 | Stern ............................ 350/160 LC |

Primary Examiner—Charlie T. Moon

[57] ABSTRACT

A method of closing a liquid crystal device after filling its substrate interspace with the liquid crystal material through a hole in one of the substrates, comprising introducing a body of plastic, hard-setting, non-reactive material into the hole; and then shaping the body, during the setting of the material, to conform with the peripheral surface of the hole. The body may be made of a silver amalgam and shaped by forcing a swage thereagainst. The resultant plug hermetically seals the hole without increasing the thickness of the device.

7 Claims, 3 Drawing Figures

PATENTED APR 30 1974 3,807,127

METHOD OF CLOSING A LIQUID CRYSTAL DEVICE

BACKGROUND OF THE INVENTION

This invention relates to a novel method of closing a liquid crystal device.

A typical liquid crystal device comprises a pair of spaced-apart, hermetically-sealed substrates and a liquid crystal material therebetween. Each substrate has an electrode on the inner surface thereof for applying an electric field across the liquid crystal material. With no field applied, the liquid crystal material is transparent; however, when a field is applied, the material becomes a foward-scatterer of light. By suitable electrode design, the device can be employed in any one of various types of displays.

The general method of fabricating the liquid crystal device described above comprises assembling the substrates in spaced-apart relationship, hermetically sealing the substrates at or near the edges thereof, pouring the liquid crystal material into the substrate interspace through a hole in one of the substrates, and then hermetically sealing or closing the hole. Usually, two holes are provided in the same substrate and metal tubulations are sealed thereto. One of the tubulations is connected to a source of liquid crystal material, while the other tubulation is connected to a source of vacuum. The space between the substrates is thereby filled completely with the liquid crystal material. Both holes are then closed by "pinching off" each of the tubulations near the substrate surface.

A major disadvantage of the closure method described above is that the pinching-off step, typically including capping of the pinched-off tubulations, increases the thickness of the liquid crystal device. This increased thickness is a problem particularly with devices designed for liquid crystal watch displays. Also, device fabrication is complicated by the need for permanently sealing the metal tubulations to one of the substrates. The tubulation seals often leak and thereby become sources of device failure.

SUMMARY OF THE INVENTION

The novel method of closing a liquid crystal device comprising a pair of spaced-apart, hermetically-sealed substrates and a liquid crystal material therebetween, one of the substrates having a hole therethrough communicating with the substrate interspace, comprises the steps of introducing a body of plastic, hard-setting material into the hole, the plastic material being nonreactive with the liquid crystal material; and then shaping the body, during the setting of the plastic material, to conform with the peripheral surface of the hole. Preferably, the plastic material is a silver amalgam, and the body is shaped by forcing a swage thereagainst.

Introducing a body of plastic, hard-setting, nonreactive material into the hole provides a means for plugging the hole which is independent of the means for filling the substrate interspace with the liquid crystal material, thereby eliminating the need for permanently attaching tubulations to one of the substrates. Silver amalgams are readily-available, inexpensive sources for the body material; also, their setting times may be readily varied. Shaping the body, during the setting of the material, to conform with the peripheral surface of the hole produces a plug which hermetically seals the hole without necessarily increasing the thickness of the liquid crystal device; and shaping by swaging assures that the plug can be so produced in a controlled, reproducible manner. The novel method has been successfully employed in the fabrication of various liquid crystal display devices.

DESCRIPTION OF THE PREFERRED EMBODIMENT

Figure 1:
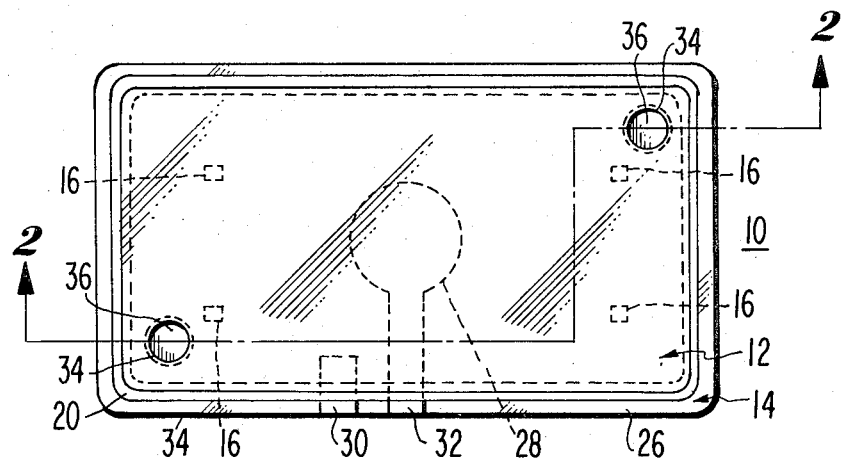
FIG. 1 is a top view of a liquid crystal device closed according to the novel method.
Figure 2:
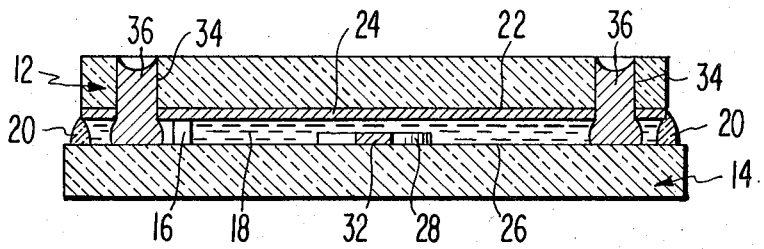
FIG. 2 is a sectional view, along the line 2—2, of the device of FIG. 1.

The following is an example of the novel closure method. As shown in FIGS. 1 and 2, a liquid crystal display device 10 comprises a first transparent-glass substrate 12 and a second transparent-glass substrate 14. The substrates 12 and 14 are maintained in spaced-apart relationship by means of a plurality of mica spacers 16 disposed inwardly of the edges of the substrates. Typically, the spacers 16 are each about 40 mils × 40 mils square and approximately 0.5 mil thick. The substrates 12 and 14 are each about 40 mils thick. Sandwiched between the substrates 12 and 14 is a liquid crystal material 18 which may be any one of the various known types. The liquid crystal material 18 is retained within the substrate interspace by a hermetic glass-frit seal 20 disposed between the substrates 12 and 14, along the edges thereof.

The substrates are generally rectangular in shape, the second substrate 14 being slightly larger than, i.e., overlapping, the first substrate 12. The inner surface 22 of the first substrate 12 is coated with a first electrode 24, which may be made of either a transparent or a reflective material, depending upon the desired mode of operation of the device 10. Disposed on the inner surface 26 of the second substrate 14 is a second electrode 28, made of a transparent material and patterned in a shape to be displayed. For illustrative purposes, the second electrode 28 is shown to be circular in shape. Also disposed on the inner surface 26 of the second substrate 14 are first and second conducting paths, 30 and 32, respectively, also made of a transparent material. The first path 30 extends from the edge portion 34 of the second substrate 14 to a metal tab (not shown), which bridges the substrate interspace and is in direct contact with the first electrode 24. The second path 32, in turn, extends from the edge portion 34 to the second electrode 26. The first and second paths 30 and 32, respectively, thus serve as the means for applying an electric field (not shown) between the first and second electrodes 24 and 28, respectively. Typically, the transparent material of the electrodes and conducting path is indium oxide, and the reflective material is aluminum.

For purposes of fabrication of the device 10, as discussed below, the first substrate 12 has two diagonally-opposed cylindrical holes 34 through the thickness thereof. Typically, the holes 34 are each about 35 mils in diameter and located near the edge of the first substrate 12, exterior to the spacers 16. Each hole 34 is hermetically closed by a silver amalgam plug 36 extending through the hole to the inner surface 26 of the second substrate 14. The plugs 36 are shaped to conform with the peripheral surfaces of their respective holes 34 and are somewhat bulbous within the substrate interspace.

Figure 3:
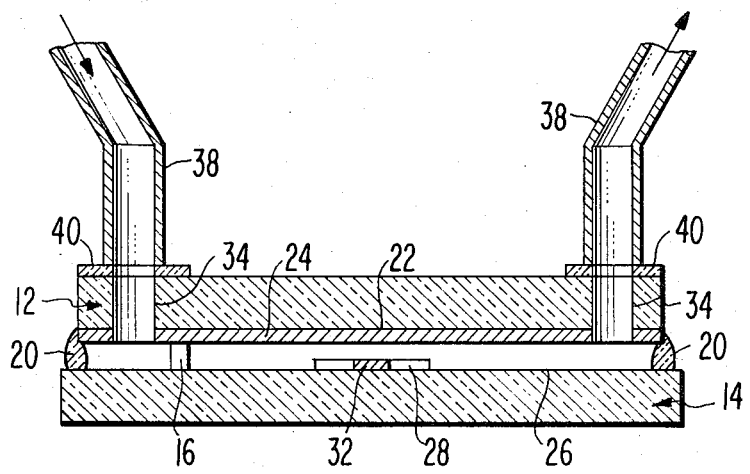
FIG. 3 is a sectional view of the device of FIG. 1, prior to the closing thereof.

The method of fabricating the device 10 comprises assembling the first and second substrates 12 and 14, respectively, in spaced-apart relationship by means of the mica spacers 16. At this step, the holes 34 through the first substrate 12 are already formed, but not yet plugged. Next, the substrates are hermetically sealed along the edges thereof, to produce the seal 20, using well-known glass-frit sealing techniques. Then the substrate interspace is filled with the liquid crystal material 18 by empllying a pair of metal tubulations 28 in communication with the unplugged holes 34, as shown in FIG. 3. Each tubulation 38 is provided with a rubber gasket 40 at one end thereof for forming a liquid-tight seal with the first substrate 12. The other or remote ends (not shown) of the tubulations 38 are then connected one to a source of the liquid crystal material 18 and the other to a source of vacuum (both sources also not shown). Simultaneous operation of the two sources facilitates complete filling of the substrate interspace, as well as the holes 34, with liquid crystal material. Following the filling steps, the tubulations 38 and gaskets 40 are removed from the first substrate 12.

The device 10 is then closed by first introducing into each hole 34 a paste-like mass or body (not shown as such) of a freshly-prepared silver amalgam. The amalgam is typically prepared by mixing appropriate quantities of mercury and a suitable alloy, such as one used in dental amalgams. Dental amalgams require the following alloy composition: silver, 65 percent, by weight, minimum; tin, 25 percent minimum; copper, 6 percent maximum; and zinc, 2 percent maximum. See *McGraw-Hill Encyclopedia of Science and Technology*, Vol. 1, p. 299 (1960). Typical among such alloys are Caulk alloys, marketed by the L. D. Caulk Company, Milford, Delaware. The percentage of mercury in dental amalgams usually varies from about 48 percent to about 62 percent, by weight, depending upon the required plasticity, i.e., setting or working time, of the mix. The percentage of mercury recommended for use with a Caulk alloy is approximately 50 percent, which affords a working time of about 3 minutes. Thus, each body of silver amalgam is introduced into its respective hole 34 immediately after its mix is completed.

Next, a swage (not shown) is manually forced against each of the silver amalgam bodies, during the setting of their respective mixes, to conform them with the peripheral surfaces of their respective holes 34. The swage is usually in the form of a solid cylindrical rod having a domed end which contacts each of the bodies, the diameter of the rod being only 2-3 mils smaller than that of the holes 34. The force is applied with both a downward or normal motion, which causes the amalgam of each thereby compacted body to cold-flow to the peripheral surface of its respective hole 34. Samll amounts of amalgam also flow into the substrate interspace regions adjacent to the holes 34, but the effective wedging action between the narrowly-separated substrate 12 and 14 is negligible. The rotational motion of the swaging force serves to break any static friction between the hardening silver amalgam bodies and the peripheral surfaces of the holes 34. The bodies are thereby shaped into the form of the silver amalgam plugs 36, effecting the required closure of the device 10.

GENERAL CONSIDERATIONS

It should be understood that the invention is not limited to the examples described above. Thus, the substrate and electrode geometries may be other than those shown in FIGS. 1 to 3. See, for example, U.S. Pat. No. 3,612,654, issued on Oct. 12, 1971, to R. I. Klein et al. The dental amalgam bodies may be introduced into the substrate holes manually or automatically, the mix being prepared with mortar and pestle or in a mechanical amalgamator. Also, the bodies may be made of a plastic, hard-setting material other than a dental amalgam. Thus, the plastic material may have a working or setting time longer than 3 minutes, thereby facilitating the material handling (e.g., storage and working) procedures. However, epoxy resins which will not cure properly in the liquid crystal material should not be employed; such materials usually have the further disadvantage of contaminating the liquid crystal material.

What is claimed is:

1. In the fabrication of a liquid crystal device comprising a pair of spaced-apart, hermetically-sealed substrates and a liquid crystal material therebetween, one of said substrates having a hole therethrough communicating with the substrate interspace, the method of closing said device comprising the steps of:
    a. preparing a mixture of a hard-setting plastic material having a fixed setting time, said plastic material being non-reactive with said liquid crystal material;
    b. introducing a body of said plastic material into said hole and in contact with the surface of the other of said substrates opposite said hole during said setting time; and
    c. plastically deforming said body in said hole, during said setting time, to conform said body with the peripheral surface of said hole.

2. The method of claim 1, wherein said plastic material is an amalgam.

3. The method of claim 1, wherein said body is shaped by swaging.

4. In the fabrication of a liquid crystal device comprising a pair of spaced-apart, hermetically-sealed substrates and a liquid crystal material therebetween, one of said substrates having at least one cylindrical hole therethrough communicating with the substrate interspace, the method of closing said device comprising the steps of:
    a. preparing a mixture of a hard-setting plastic material having a fixed setting time, said plastic material being non-reactive with said liquid crystal material;
    b. introducing, during said setting time, a body of said material into said hole and in contact with the surface of the other of said substrates opposite said hole; and
    c. forcing a swage against said body to conform it, during the setting of said material, with the peripheral surface of said hole.

5. The method of claim 4, wherein said material is an amalgam comprising silver.

6. The method of claim 5, wherein said amalgam is a dental amalgam.

7. In the fabrication of a liquid crystal device comprising a pair of spaced-apart, hermetically sealed substrates and a liquid crystal material therebetween, one of said substrates having a cylindrical hole therethrough communicating with the substrate interspace, the method of closing said device comprising the steps of:

a. preparing a mix of hard-setting plastic material having a fixed setting time, said plastic material being non-reactive with said liquid crystal material;

b. introducing, during said setting time, a body of said material into said hole and in contact with the surface of the other of said substrates opposite said hole; and c. forcing a swage against said body to conform it, during said setting time, with the peripheral surface of said hole and to enlarge the portion of said body in said interspace to a somewhat bulbous configuration.

* * * * *